United States Patent
Velayudhan et al.

(10) Patent No.: US 9,755,895 B2
(45) Date of Patent: *Sep. 5, 2017

(54) SYSTEM AND METHOD FOR CONFIGURATION OF LINK AGGREGATION GROUPS

(71) Applicant: DELL PRODUCTS L.P., Round Rock, TX (US)

(72) Inventors: Mukesh Moopath Velayudhan, Fremont, CA (US); Pathangi Narasimhan Janardhanan, Santa Clara, CA (US); Senthil Kumar Ganesan, Fremont, CA (US); Amita Gupta Tare, San Jose, CA (US)

(73) Assignee: DELL PRODUCTS L.P., Round Rock, TX (US)

( * ) Notice: Subject to any disclaimer, the term of this patent is extended or adjusted under 35 U.S.C. 154(b) by 14 days.

This patent is subject to a terminal disclaimer.

(21) Appl. No.: 14/732,255

(22) Filed: Jun. 5, 2015

(65) Prior Publication Data

US 2015/0271015 A1 Sep. 24, 2015

Related U.S. Application Data

(63) Continuation of application No. 13/909,701, filed on Jun. 4, 2013, now Pat. No. 9,059,909.

(51) Int. Cl.
*H04L 12/24* (2006.01)
*H04L 12/709* (2013.01)
(Continued)

(52) U.S. Cl.
CPC ...... *H04L 41/0806* (2013.01); *H04L 41/0889* (2013.01); *H04L 45/026* (2013.01);
(Continued)

(58) Field of Classification Search
CPC H04L 45/245; H04L 41/0806; H04L 41/0889
See application file for complete search history.

(56) References Cited

U.S. PATENT DOCUMENTS

8,005,794 B2 8/2011 Cantrill
9,059,909 B2 * 6/2015 Velayudhan ........ H04L 41/0806
(Continued)

*Primary Examiner* — Benjamin H Elliott, IV
(74) *Attorney, Agent, or Firm* — Haynes and Boone, LLP (57) ABSTRACT

A system and method of configuration of link aggregation groups includes a control unit and a port coupled to the control unit and configured to couple the network switching device to a neighboring switch. The control unit is configured to transmit a probe message to the neighboring switch, receive a remote switch identifier and link aggregation group (LAG) identifier from the neighboring switch, determine whether the remote switch identifier matches a previously received remote switch identifier and the remote LAG identifier matches a previously received remote LAG identifier. When both match, determine a first LAG associated with the previously received remote switch identifier and the previously received remote LAG identifier and assign the port to the first LAG. When both do not match, to create a second LAG, assign the port to the second LAG, and associate the remote switch identifier and the remote LAG identifier with the second LAG.

18 Claims, 5 Drawing Sheets

(51) Int. Cl.
 *H04L 12/751* (2013.01)
 *H04L 12/26* (2006.01)
(52) U.S. Cl.
 CPC ............ *H04L 45/245* (2013.01); *H04L 43/10*
  (2013.01); *Y02B 60/33* (2013.01)

(56) References Cited

U.S. PATENT DOCUMENTS

| | | | |
|---|---|---|---|
| 2012/0087372 A1* | 4/2012 | Narasimhan | H04L 45/245 370/392 |
| 2012/0127853 A1* | 5/2012 | Tatsumi | H04L 49/557 370/217 |
| 2014/0215027 A1* | 7/2014 | Janardhanan | H04L 41/0803 709/220 |
| 2014/0269695 A1* | 9/2014 | Tsai | H04L 45/745 370/389 |
| 2015/0271015 A1* | 9/2015 | Velayudhan | H04L 41/0806 370/254 |

* cited by examiner

SYSTEM AND METHOD FOR CONFIGURATION OF LINK AGGREGATION GROUPS

CROSS REFERENCE TO RELATED APPLICATIONS

This application is a continuation of U.S. patent application Ser. No. 13/909,701 filed on Jun. 4, 2013, the full disclosure of which is incorporated by reference herein in its entirety and for all purposes.

BACKGROUND

The present disclosure relates generally to information handling systems, and more particularly to configuration of link aggregation groups.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Additionally, some embodiments of information handling systems include non-transient, tangible machine-readable media that include executable code that when run by one or more processors, may cause the one or more processors to perform the steps of methods described herein. Some common forms of machine readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Computer networks form the interconnection fabric that enables reliable and rapid communications between computer systems and data processors that are in both close proximity to each other and at distant locations. These networks create a vast spider web of intranets and internets for handling all types of communication and information. Making all of this possible is a vast array of network switching products that make forwarding decisions in order to deliver packets of information from a source system or first network node to a destination system or second network node. Due to the size, complexity, and dynamic nature of these networks, sophisticated network switching products are often used to implement the interconnection fabric. This can be further complicated through other networking trends such as parallelization.

Many networks utilize parallelization and other techniques to improve the forwarding function between two network nodes. By employing parallelization, redundancy is built into a network so that it is possible that more than one path exists between any two nodes. This provides suitably aware network switching products with the ability to select between the redundant paths to avoid network congestion, balance network loads, or to avoid failures in the network. Parallelization also provides the ability to handle more network traffic between two nodes than is possible when parallelization is not utilized. In some implementations the parallelization is treated in a more formalized fashion in the form of a link aggregation group (LAG). In a LAG, multiple network links are often bundled into a group to support the parallelization function. For suitably aware network switching products, the LAG can offer a flexible option to select any of the network links in the LAG when forwarding network traffic. And while LAGs offer additional flexibility in network forwarding they also add complexity to the network configuration function.

Accordingly, it would be desirable to provide improved network switching products that can determine the configuration of LAGs.

SUMMARY

According to one embodiment, a network switching device includes a control unit and a port coupled to the control unit and configured to couple the network switching device to a neighboring switch. The control unit is configured to transmit a probe message to the neighboring switch using the port, receive a remote switch identifier and a remote link aggregation group (LAG) identifier from the neighboring switch on the port, determine whether the remote switch identifier matches a previously received remote switch identifier, and determine whether the remote LAG identifier matches a previously received remote LAG identifier. When both the remote switch identifier matches the previously received remote switch identifier and the remote LAG identifier matches the previously received remote LAG identifier, the control unit is further configured to determine a first LAG associated with the previously received remote switch identifier and the previously received remote LAG identifier and assign the port to the first LAG. When either the remote switch identifier does not match the previously received remote switch identifier or the remote LAG identifier does not match the previously received remote LAG identifier, the control unit is further configured to create a second LAG, assign the port to the second LAG, and associate the remote switch identifier and the remote LAG identifier with the second LAG.

According to another embodiment, a method of configuring a network switching device includes transmitting a probe message to a neighboring switch using a port of the network switching device, receiving a remote switch identifier and a remote link aggregation group (LAG) identifier from the neighboring switch on the port, determining whether the remote switch identifier matches a previously received remote switch identifier, and determining whether the remote LAG identifier matches a previously received remote LAG identifier. When both the remote switch identifier matches the previously received remote switch identifier and the remote LAG identifier matches the previously received remote LAG identifier, the method further includes determining a first LAG associated with the previously received remote switch identifier and the previously received remote LAG identifier and assigning the port to the first LAG. When either the remote switch identifier does not match the previously received remote switch identifier or the remote LAG identifier does not match the previously received remote LAG identifier, the method further includes creating a second LAG, assigning the port to the second LAG, and associating the remote switch identifier and the remote LAG identifier with the second LAG. The neighboring switch is coupled to the network switching device via the port.

According to yet another embodiment, an information handling system includes a network switch device. The network switching device includes a control unit comprising one or more processors, a memory coupled to the control unit, and a port coupled to the control unit and configured to couple the network switching device to a neighboring switch. The memory includes a plurality of machine-readable instructions which when executed by the one or more processors are adapted to cause the one or more processors to transmit a probe message to the neighboring switch using the port, receive a remote switch identifier and a remote link aggregation group (LAG) identifier from the neighboring switch on the port, and determine whether the remote switch identifier matches a previously received remote switch identifier, determine whether the remote LAG identifier matches a previously received remote LAG identifier. When both the remote switch identifier matches the previously received remote switch identifier and the remote LAG identifier matches the previously received remote LAG identifier, the plurality of machine-readable instructions which when executed by the one or more processors are adapted to cause the one or more processors to determine a first LAG associated with the previously received remote switch identifier and the previously received remote LAG identifier and assign the port to the first LAG. When either the remote switch identifier does not match the previously received remote switch identifier or the remote LAG identifier does not match the previously received remote LAG identifier, the plurality of machine-readable instructions which when executed by the one or more processors are adapted to cause the one or more processors to create a second LAG, assign the port to the second LAG, and associate the remote switch identifier and the remote LAG identifier with the second LAG. The port includes a down state, an individual state, and a bundled state.

BRIEF DESCRIPTION OF THE DRAWINGS

In the figures, elements having the same designations have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
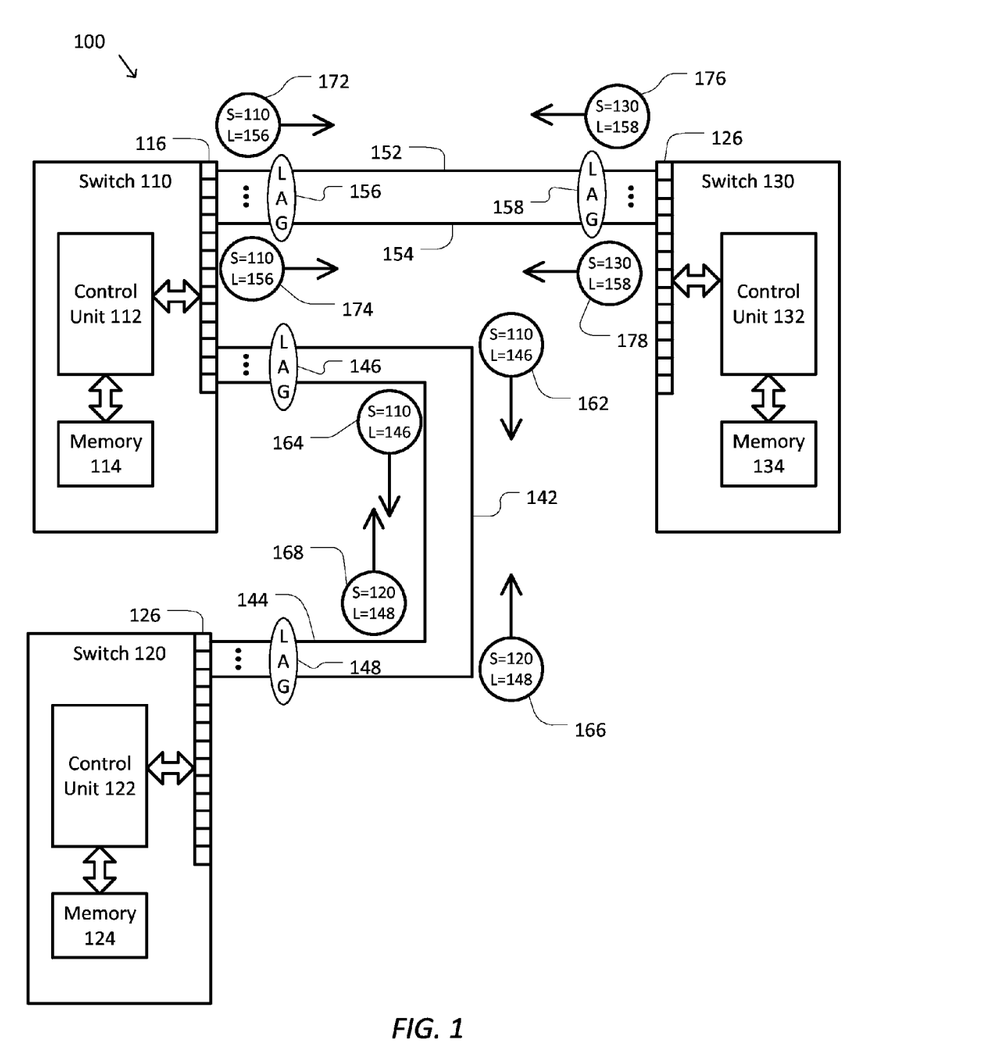
FIG. 1 shows a simplified diagram of a network according to some embodiments.

FIG. 1 shows a simplified diagram of a network 100 according to some embodiments. As shown in FIG. 1, network 100 may include network switching devices or switches 110, 120, and 130. And although only three switches are shown in network 100, it would be understood that network 100 may include any number of switches. As shown, switch 100 includes a control unit 112 and a memory 114. The control unit 112 is coupled to the memory 114 and may control the operation of the switch 110. In some examples, the control unit 112 may be used to make forwarding decisions for network traffic being handled by the switch 110. In some examples, the control unit 112 may include one or more processors. The switch 110 further includes one or more ports 116 for coupling the switch 110 to other switches and/or network devices using network links. In some examples, the control unit 112 may use one or more protocols to communicate with the other switches and network devices using the one or more ports 116 and network links. The memory 114 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Similarly, switch 120 includes a control unit 122 and memory 124. The control unit 122 is coupled to the memory 124 and may control the operation of the switch 120. In some examples, the control unit 122 may be used to make forwarding decisions for network traffic being handled by the switch 120. In some examples, the control unit 122 may include one or more processors. The switch 120 further includes one or more ports 126 for coupling the switch 120 to other switches and/or network devices using network links. In some examples, the control unit 122 may use one or more protocols to communicate with the other switches and network devices using the one or more ports 126 and network links. The memory 124 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Similarly, switch 130 includes a control unit 132 and memory 134. The control unit 132 is coupled to the memory 134 and may control the operation of the switch 130. In some examples, the control unit 132 may be used to make forwarding decisions for network traffic being handled by the switch 130. In some examples, the control unit 132 may include one or more processors. The switch 130 further includes one or more ports 136 for coupling the switch 130 to other switches and/or network devices using network links. In some examples, the control unit 132 may use one or more protocols to communicate with the other switches and network devices using the one or more ports 136 and network links. The memory 134 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

As further shown in FIG. 1, switch 110 is coupled to switch 120 using network links 142 and 144, making switches 110 and 120 neighbors. And although only two network links are shown between switches 110 and 120, it would be understood that switches 110 and 120 may be coupled using any number of network links. Because switches 110 and 120 are coupled using the network links 142 and 144, both switches 110 and 120 may organize the network links 142 and 144 using LAGs. As shown, switch 110 has grouped and/or assigned the network links 142 and 144 into a LAG 146. When switch 110 decides to forward network traffic to switch 120, it may do so using LAG 146, where a LAG hashing mechanism may be used to select from among the network links in LAG 146 (e.g., the network links 142 and 144). In some examples, switch 110 may form a LAG even when only one network link couples switch 110 to another switch. Similarly, switch 120 has grouped the network links 142 and 144 into a LAG 148 that switch 120 may use to forward network traffic to switch 110.

Switch 110 is also coupled to switch 130 using network links 152 and 154, making switches 110 and 130 neighbors. Similar to the arrangement between switches 110 and 120, switch 110 has grouped and/or assigned the network links 152 and 154 into a LAG 156, which switch 110 may use for forwarding network traffic to switch 130. Likewise, switch 130 has grouped the network links 152 and 154 into a LAG 158, which switch 130 may use to forward network traffic to switch 110.

According to some embodiments, due to the complexity of the network links and coupling between the switches 110, 120, and/or 130, message passing protocols may be used by the switches 110, 120, and/or 130 to confirm configuration of the network links and coupling associated with each of the LAGs 146, 148, 156, and/or 158. In some examples, these message passing protocols may be used to confirm a status of the network links and/or ports coupling any two switches. In some examples, these message passing protocols may be used to confirm that proper cabling is installed to create the network links.

According to some embodiments, FIG. 1 depicts one possible message passing protocol that may be used to confirm configuration of the network links and coupling associated with the LAGs 146, 148, 156, and 158. In some examples, switches 110, 120, and 130 may have previously received their configuration, including the configuration of the LAGs 146, 148, 156, and 158. In some examples, as part of this configuration, each of the switches 110, 120, and 130 may receive a unique switch identification number or identifier (switch-id). In some examples, the switch-id may be a system identification number or system identifier. In some examples, the configuration may also identify any LAGs of each of the switches 110, 120, and 130 as well as the neighboring switch coupled to the respective switch using the respective LAG. In some examples, the configuration may also assign a LAG identification number or LAG identifier (LAG-id) to each of the LAGs. In some examples, the LAG-id may be a port key.

In the message passing protocol of FIG. 1, each of the switches 110, 120, and 130 transmits a message, including the switch-id of the switch and the LAG-id for the LAG associated with the respective port, on each of its ports. Under the message passing protocol, switch 110 transmits one or more messages on each of the ports 116 associated with LAG 146 with each of the messages containing a switch-id of 110 and a LAG-id of 146 (S=110, L=146). As shown switch 110 transmits a message 162 containing the switch-id of 110 and the LAG-id of 146 on network link 142 and a message 164 containing the switch-id of 110 and the LAG-id of 146 on network link 144. Similar message are also transmitted by switch 110 on the other network links associated with LAG 146. When the messages 162 and 164 are received by switch 120, switch 120 may use the included switch-id of 110 and LAG-id of 146 (sometimes referred to as the remote switch-id and remote LAG-id) to confirm that they are consistent with the previously received configuration of switch 120 indicating that switch 120 is coupled to switch 110 using LAG 148. In some examples, the remote LAG-id may be different from the LAG-id of 148 used by the switch 120 as long as the messages received by switch 120 on all the ports 126 associated with LAG 148 include the same remote LAG-id. In some examples, if any message is received without an expected and/or matching remote switch-id and/or remote LAG-id, a configuration error may be detected.

Similarly, switch 120 may transmit messages (e.g., messages 166 and 168) including a switch-id of 120 and a LAG-id of 148 on all of the ports 126 associated with LAG 148 to switch 110. When these messages are received by switch 110, switch 110 may use them to confirm the configuration for LAG 146. A similar message passing may similarly occur between switches 110 and 130. Switch 110 may transmit messages (e.g., messages 172 and 174) including a switch-id of 110 and a LAG-id of 156 on all of the ports 116 associated with LAG 156 to switch 130. When these messages are received by switch 130, switch 130 may use them to confirm the configuration for LAG 158. Similarly, switch 130 may transmit messages (e.g., messages 176 and 178) including a switch-id of 130 and a LAG-id of 158 on all of the ports 136 associated with LAG 158 to switch 110. When these messages are received by switch 110, switch 110 may use them to confirm the configuration for LAG 156.

In some examples, the message passing protocol of FIG. 1 may be the Link Aggregation Control Protocol (LACP). In some examples, the messages 162, 164, 166, 168, 172, 174, 176, and/or 178 may be LACP Data Units (LACPDUs).

Figure 2:
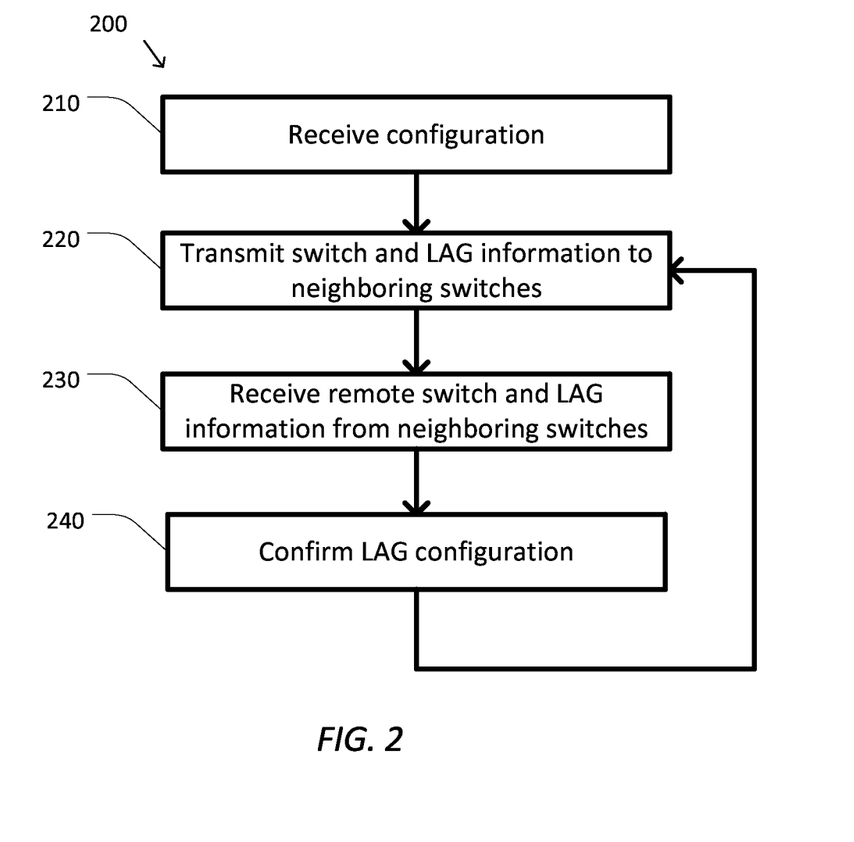
FIG. 2 shows a simplified diagram of a method of confirming the configuration of one or more LAGs of a switch according to some embodiments.

FIG. 2 shows a simplified diagram of a method 200 of confirming the configuration of one or more LAGs of a switch according to some embodiments. As shown in FIG. 2, the method 200 includes a process 210 for receiving a configuration, a process 220 for transmitting switch and LAG information to neighboring switches, a process 230 for receiving remote switch and LAG information from neighboring switches, and a process 240 for confirming a LAG configuration. According to certain embodiments, the method 200 of confirming the configuration of one or more LAGs of a switch can be performed using variations among the processes 210-240 as would be recognized by one of ordinary skill in the art. In some embodiments, the process 220 may occur after or during the processes 230 and/or 240. In some embodiments, one or more of the processes 210-240 may be implemented, at least in part, in the form of executable code stored on non-transient, tangible, machine readable media that when run by one or more processors (e.g., the one or more processors in the control units 112, 122, and/or 132) may cause the one or more processors to perform one or more of the processes 210-240.

At the process 210, a configuration is received. During configuration and/or provisioning of a switch (e.g., the switch 110, 120, and/or 130), the switch may receive its configuration. In some examples, the configuration may be received as a Dynamic Host Configuration Protocol (DHCP) offer sent by a DHCP server in response to a DCHP request made by the switch. In some examples, the configuration may be received from a user. In some examples, the configuration may include a switch-id for the switch. In some examples, the configuration may include LAG-ids for one or more LAGs of the switch. In some examples, the configuration may include switch-ids of one or more neighboring switches of the switch. In some examples, at least a portion of the configuration may be confirmed by the process 200.

At the process 220, switch and LAG information is transmitted to neighboring switches. After the switch has received its configuration, it may transmit one or more outgoing messages with switch and LAG information to neighbors of the switch. In some examples, when the switch is the switch 110, some of the one or more outgoing messages may be transmitted to switches 120 and 130. In some examples, when the switch is the switch 120, some of the one or more outgoing messages may be transmitted to switch 110. In some examples, when the switch is the switch 130, some of the one or more outgoing messages may be transmitted to switch 110. In some examples, each of the one or more outgoing messages may include a switch-id associated with the switch and a LAG-id associated with the port on which the corresponding one or more outgoing messages is transmitted. In some examples, the one more outgoing messages may be one or more of the messages 162, 164, 166, 168, 172, 174, 176, and/or 178. In some examples, the one or more outgoing messages may be LACPDUs.

At the process 230, remote switch and LAG information may be received from neighboring switches. In some examples, the switch may receive one or more incoming messages that include a remote switch-id and remote LAG-id at each of its ports. In some examples, the one or more incoming messages may be received from a neighboring switch associated with the remote switch-id. In some examples, the one or more incoming messages may be transmitted by the neighboring switch during its corresponding process 220. In some examples, the one or more incoming messages may be transmitted by the neighboring switch in response to the one or more outgoing messages sent to the neighboring switch during the process 220. In some examples, the one more incoming messages may be one or more of the messages 162, 164, 166, 168, 172, 174, 176, and/or 178. In some examples, the one or more incoming messages may be LACPDUs.

At the process 240, a LAG configuration may be confirmed. By comparing the configuration received during the process 210 and the remote switch and LAG information received from the neighboring switches during the process 230, the switch may be able to confirm the LAG configuration. In some examples, when a switch receives an incoming message with a remote switch-id and a remote LAG-id on a port assigned to one of its LAGs and another incoming message with the same remote switch-id and the same remote LAG-id on another port assigned to the same LAG, the switch may confirm the LAG configuration. In some examples, the switch may detect a configuration error when the another incoming message includes a different remote switch-id and/or a different remote LAG-id on the another port associated with the same LAG. In some examples, the switch may detect another configuration error when the another incoming message includes the same remote switch-id and same remote LAG-id on the another port assigned to a different LAG. In some examples, the switch may detect yet another configuration error when no incoming message is received on a port assigned to a LAG indicating that the neighboring switch associated with the port is not connected and/or not able to respond.

In some embodiments, the process 240 may be illustrated using the network of FIG. 1. In some examples, the switch 110 may confirm a configuration of LAG 156 when all of the incoming messages (e.g., the messages 176 and 178) received on the ports associated with LAG 156 include a same remote switch-id (e.g., 130) and a same LAG-id (e.g., 158) indicating that all of the incoming messages originated from a same remote switch (e.g., switch 130) and LAG (e.g., LAG 158). In some examples, switch 110 may detect a configuration error for LAG 156 when two or more of the incoming messages received on the ports associated with LAG 156 include differences in the remote switch-id, the remote LAG-id, or both. In some examples, if the network link 154 was erroneously coupled between switches 110 and 120 rather than between switches 110 and 130, switch 110 may receive incoming messages on the ports associated with LAG 156 that include a remote switch-id of 130 and a remote LAG-id of 158 via the network link 152 and a remote-switch-id of 120 and a remote LAG-id of 148 via the erroneously wired network link 154. Because the two remote switch-ids and two remote LAG-ids are not the same, switch 110 may detect this configuration error. In some examples, switch 110 may detect a configuration error for both LAGs 146 and 156 when two or more of the incoming messages received on ports associated with different LAGs include a same remote switch-id and/or a same remote LAG-id. In some examples, if the network link 142 was erroneously coupled between switches 110 and 130, switch 110 may receive incoming messages on ports associated with LAGs 146 and 156 that include a same remote switch-id of 130 and a same remote LAG-id of 158. Because the same remote switch-id and the same remote LAG-id are received on different LAGs of switch 110, switch 110 may detect this configuration error.

In some embodiments, the method 200 of confirming the configuration of one or more LAGs of a switch may work when the neighboring switch is in either an active or a passive mode. In some examples, switches using the LACP may operate in either the active or passive mode. Switches using the LACP in active mode may transmit LACPDUs, including a switch-id and a LAG-id, to neighboring switches without prompting. Switches using the LACP in passive mode do not transmit LACPDUs to neighboring switches until LACPDUs are first received from the neighboring switches. In some examples, when a neighboring switch using the LACP is in the active mode, the neighboring switch transmits its outgoing LACPDUs during its process 220 without first waiting to receive any LACPDUs. In some examples, when the neighboring switch using the LACP is in the passive mode, the neighboring switch will not transmit its outgoing LACPDUs during its process 220 until the neighboring switch receives incoming LACPDUs during its process 230. Because a switch using method 200 along with the LACP transmits outgoing LACPDUs to the neighboring switch during the switch's process 220, the switch may provoke the neighboring switch into responding with the outgoing LACPDUs of the neighboring switch, which the switch receives as incoming LACPDUs during the switch's process 230. Thus, by transmitting outgoing LACPDUs during the process 220, the switch may receive incoming LACPDUs during process 230 even when the neighboring switch is in the passive mode.

In some embodiments, the method 200 of confirming the configuration of one or more LAGs of a switch may be limited. In some examples, method 200 may only be used to confirm the configuration of the one or more LAGs. In some examples, method 200 includes process 210 for receiving a configuration so that every switch practicing method 200 receives a configuration before it can transmit its switch and LAG information during the process 220 and/or to confirm the configuration during the process 240. Thus, it would be advantageous if a switch could use any received remote switch and LAG information even though the switch may not receive a configuration.

Figure 3:
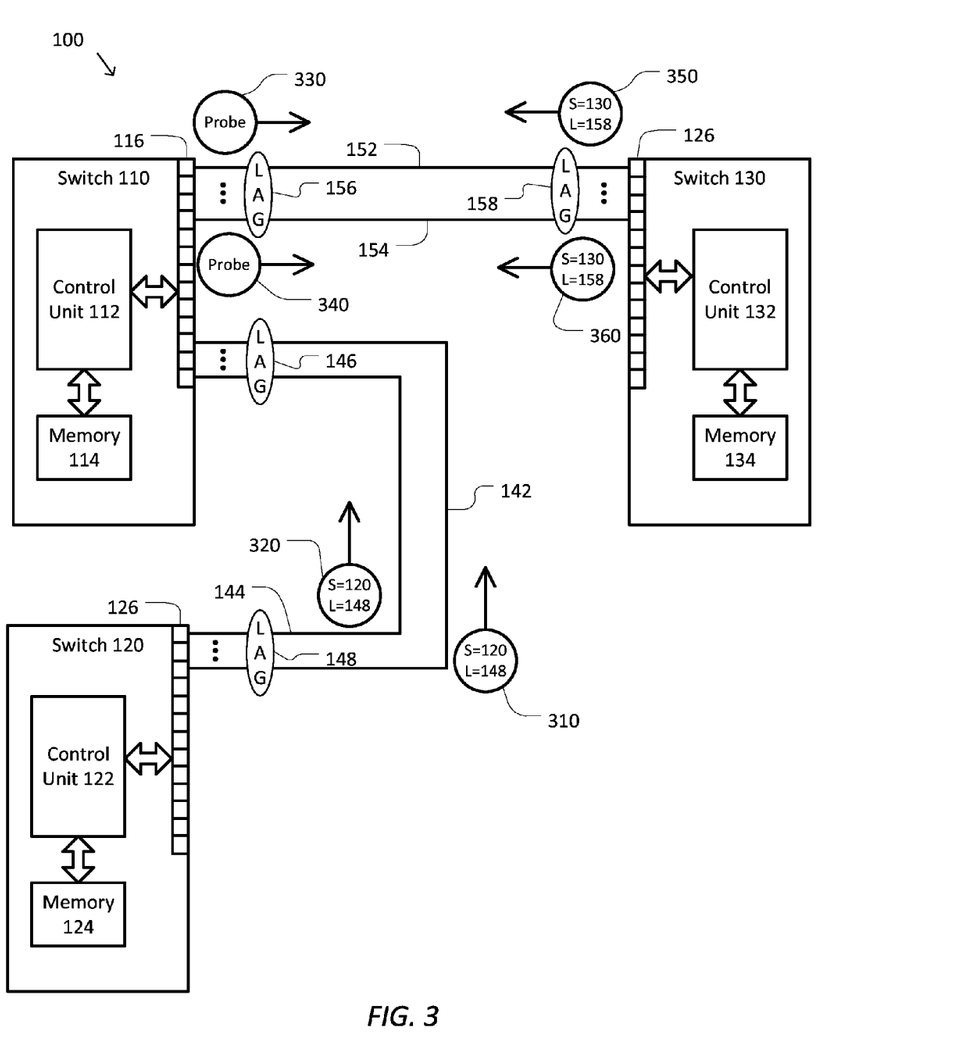
FIG. 3 shows a simplified diagram of switch configuration discovery in the network of FIG. 1 according to some embodiments.

FIG. 3 shows a simplified diagram of switch configuration discovery in the network 100 of FIG. 1 according to some embodiments. As shown in FIG. 3, the network 100 includes switches 110, 120, and 130. Switch 110 is coupled to switch 120 using the network links 142 and 144. Switch 110 is also coupled to switch 130 using the network links 152 and 154. In contrast with FIG. 1 where all three of the switches 110, 120, and 130 received a configuration (e.g., using the process 210) and are aware of their respective configurations, in FIG. 3 only switches 120 and 130 received a configuration. This means that switch 120 knows the configuration of LAG 148 and the assignment of network links 142 and 144 to LAG 148. Similarly, switch 130 knows the configuration of LAG 158 and the assignment of network links 152 and 154 to LAG 158. However, because switch 110 has not received a configuration, switch 110 does not know whether it has any LAGs and more specifically does not know the configuration of LAGs 146 and 156. In some examples, despite not receiving a configuration, switch 110 may learn a configuration of LAGs 146 and 156 using a message passing protocol as shown in FIG. 3.

As further shown in FIG. 3, switch 120 may be in the active mode. Because switch 120 is in the active mode, switch 120 may share its switch and LAG information with neighboring switches, such as switch 110, without prompting. Switch 120 may transmit a message 310 using network link 142 to switch 110. Message 310 includes a switch-id of 120 and a LAG-id of 148. When switch 110 receives message 310, switch 110 may learn that network link 142 is part of a LAG coupling switch 110 with switch 120. As a result, switch 110 may create a LAG for forwarding network traffic to switch 120 and assign network link 142 and/or the port 116 coupled to network link 142 to the LAG. This LAG, will eventually become LAG 146. Switch 120 may also transmit a message 320 using network link 144 to switch 110. Message 320 includes a switch-id of 120 and a LAG-id of 148. When switch 110 receives message 320, switch 110 may learn that network link 144 is part of the same LAG coupling switch 110 with switch 120 as network link 142. Switch 110 knows that network link 142 and 144 are part of the same LAG because both message 310 and message 320 included the switch-id of 120 and the LAG-id of 148. As a result, switch 110 may also assign network link 144 and/or the associated port 116 to LAG 146, completing the configuration of LAG 146. Although the above example assumes that message 310 is received by switch 110 prior to message 320, it is understood that the same outcome results if the order of messages 310 and 320 is reversed. In some examples, when LAG 148 includes additional network links, similar messages including the switch-id of 120 and the LAG-id of 148 on those additional network links result in those network links and/or associated ports 116 being assigned to LAG 146. Thus, switch 110 may learn the configuration of LAG 146 from the messages 310 and 320 received from switch 120. In some examples, messages 310 and/or 320 may be LACPDUs.

As also shown in FIG. 3, switch 130 may be in the passive mode. Because switch 130 is in the passive mode, switch 130 does not share its switch and LAG information with neighboring switches, such as switch 110, without prompting. Despite this, switch 110 may still learn configuration of LAG 156 by prompting switch 130 into sharing the switch and LAG information of switch 130. In some examples, when switch 110 does not receive any messages with switch and LAG information at some of the one or more ports 116, switch 110 may transmit a probe message on each of those ports to prompt neighboring switches in passive mode to provide their switch and LAG information. FIG. 3 shows that switch 110 may transmit a probe message 330 using network link 152 to switch 130 and a probe message 340 using network link 154 to switch 130. In some examples, probe messages 330 and 340 may be LACPDUs with empty switch and LAG information. In some examples, probe messages 330 and 340 may include a switch-id of 110 and a LAG-id associated with a respective port on which probe message 330 or 340 are transmitted. When switch 130 receives probe message 330 on network link 152, switch 130 may respond by transmitting a message 350 back on network link 152. Message 350 includes a switch-id of 130 and a LAG-id of 158. When switch 110 receives message 350, switch 110 may create LAG 156 and assign network link 152 and/or the associated port 116 to LAG 156. Similarly, when switch 130 receives probe message 340 on network link 154, switch 130 may respond by transmitting a message 360 back on network link 154. Message 360 also includes the switch-id of 130 and the LAG-id of 158. When switch 110 receives message 360, switch 110 may recognize the same switch-id of 130 and the same LAG-id of 158 and assign network link 154 and/or the associated port 116 to LAG 156. As with messages 310 and 320, the order in which switch 110 receives messages 350 and 360 does not affect the resulting configuration of LAG 156. Similarly, additional probe messages and responding messages may be exchanged between switches 110 and 130 to assign any additional network links and/or associated ports 116 to LAG 156. Thus, switch 110 may learn the configuration of LAG 156 from the messages 350 and 360 received from switch 130. In some examples, messages 350 and/or 360 may be LACPDUs.

In some embodiments, once switch 110 learns the configurations of LAGs 146 and 148, the configuration of LAGs 146, 148, 156, and 158 and associated cabling may then be confirmed by the exchange of messages between switches 110, 120, and/or 130. In some examples, the message passing of FIG. 1 and/or the process 220-240 of method 200 may be used to perform the confirmation.

Figure 4:
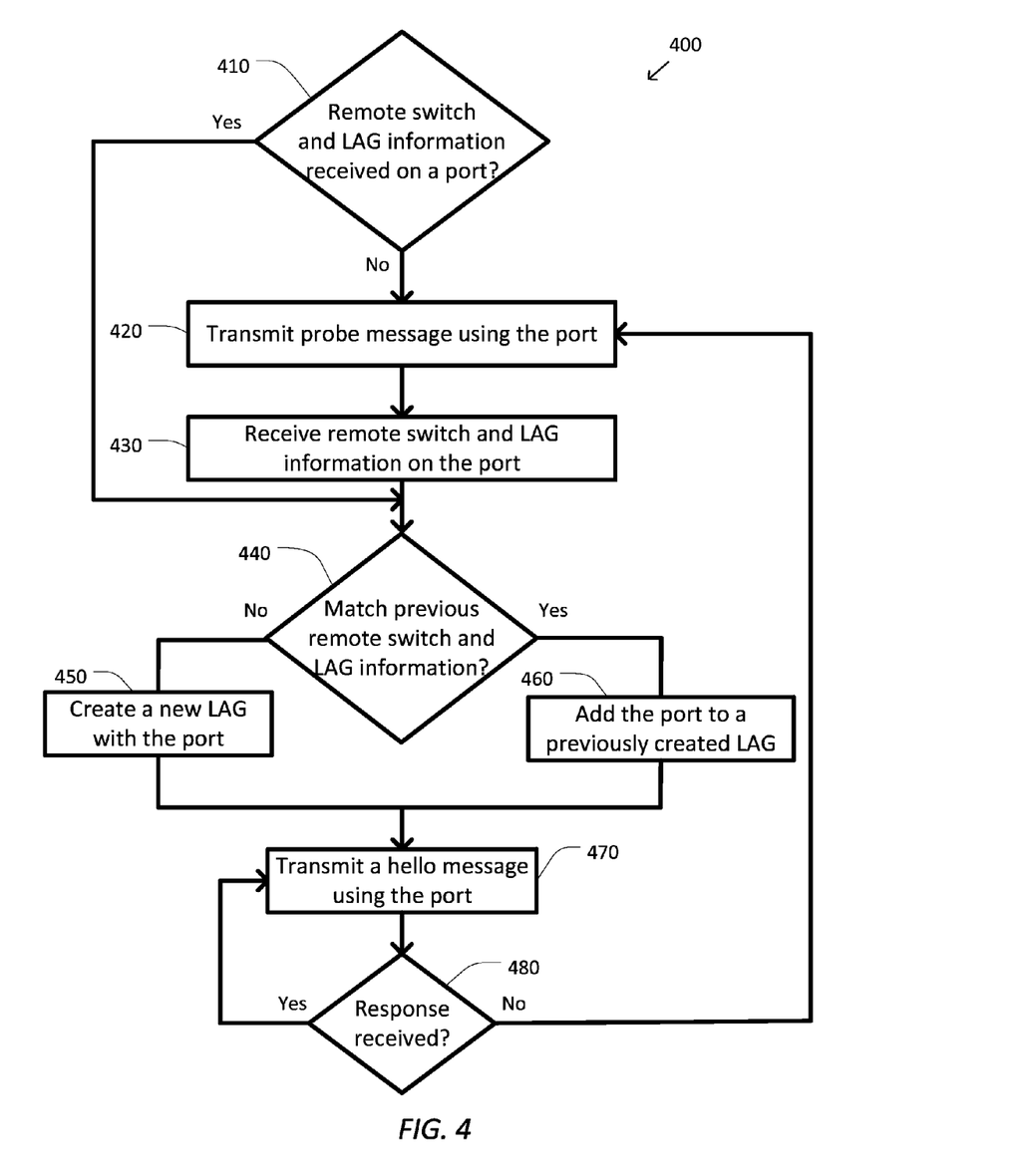
FIG. 4 shows a simplified diagram of a method of managing a configuration of one or more LAGs of a switch according to some embodiments.

FIG. 4 shows a simplified diagram of a method 400 of managing a configuration of one or more LAGs of a switch according to some embodiments. As shown in FIG. 4, the method 400 includes a process 410 for determining whether remote switch and LAG information is received on a port, a process 420 for transmitting a probe message using the port, a process 430 for receiving remote switch and LAG information on the port, a process 440 for determining whether the received remote switch and LAG information matches previously received remote switch and LAG information, a process 450 for creating a new LAG with the port, a process 460 for adding the port to a previously created LAG, a process 470 for transmitting a hello message using the port, and a process 480 for determining whether a response is received. According to certain embodiments, the method 400 of managing a configuration of one or more LAGs of a switch can be performed using variations among the processes 410-480 as would be recognized by one of ordinary skill in the art. In some embodiments, one or more of the processes 470 and 480 are optional and may be omitted. In some embodiments, one or more of the processes 410-480 may be implemented, at least in part, in the form of executable code stored on non-transient, tangible, machine readable media that when run by one or more processors (e.g., the one or more processors in the control units 112, 122, and/or 132) may cause the one or more processors to perform one or more of the processes 410-480.

At the process 410, it is determined whether remote switch and LAG information is received on a port. In some examples, a switch may receive, from a neighboring switch, one or more incoming messages that include a remote switch-id and a remote LAG-id at one of the ports of the switch. In some examples, the one or more incoming messages may be LACPDUs. In some examples, the one or more incoming messages may be the messages 310, 320, 350, and/or 360. In some examples, when the switch receives the remote switch and LAG information, the switch does not prompt the neighboring switch to send the remote switch and LAG information and processes 420 and 430 may be skipped. In some examples, the neighboring switch may be in the active mode. In some examples, when the switch does not receive the remote switch and LAG information, the switch may prompt the neighboring switch for the remote switch and LAG information using the process 420.

At the process 420, a probe message is transmitted on the port. In some examples, when the switch does not receive remote switch and LAG information on the port, the switch may conclude that the neighboring switch coupled to the port is in the passive mode. In some examples, in order to prompt the neighboring switch into transmitting the neighboring switch's switch and LAG information, the switch may transmit the probe message using the port. In some examples, the probe message may be a LACPDU. In some examples, the probe message may be the probe message 330 and/or 340. In some examples, the probe message may include empty switch and LAG information. In some examples, the probe message may include a switch-id of the switch and a LAG-id associated with a respective port on which the probe message is transmitted.

At the process 430, remote switch and LAG information may be received on the port. In some examples, the switch may receive one or more incoming messages that include a remote switch-id and remote LAG-id on the port. In some examples, the one or more incoming messages may be received from the neighboring switch associated with the remote switch-id. In some examples, the one or more incoming messages may be transmitted by the neighboring switch in response to the probe message transmitted during the process 420. In some examples, the one or more incoming messages may be LACPDUs. In some examples, the one more incoming messages may be one or more of the messages 310, 320, 350, and/or 360. Although not shown in FIG. 4, in some embodiments, when the remote switch and LAG information is not received, the process 420 may be used to transmit additional probe messages.

At the process 440, it is determined whether the received remote switch and LAG information matches previously received remote switch and LAG information. During the process 440, the remote switch and LAG information received during the process 430 or determined to be received during the process 410 is compared to previously received remote switch and LAG information. When the received remote switch and LAG information matches previously received remote switch and LAG information, the port at which the remote switch and LAG information is received may be added to a previously created LAG using the process 460. When the received remote switch and LAG information does not match any previously received remote switch and LAG information, a new LAG is created using the process 450.

At the process 450, a new LAG is created with the port. In some examples, when a new combination of remote switch-id and LAG-id are received on the port, the switch may conclude that the port is a member of a previously unknown LAG. In some examples, the switch may add the previously unknown LAG to the switch's configuration by creating the new LAG and assigning the port and/or the associated network link to the new LAG. In some examples, the new LAG is associated with the received remote switch-id and LAG-id so that other ports and/or network links may be correctly assigned to the new LAG in later uses of the processes 440 and 460. After the new LAG is created, the switch may begin maintenance and verification of the new LAG using the processes 470 and 480.

At the process 460, the port is added to a previously created LAG. In some examples, when the combination of remote switch-id and LAG-id received on the port matches a previously received combination of remote switch-id and LAG-id, the switch may conclude that the port is a member of a previously created LAG associated with the previously received combination of remote switch-id and LAG-id. In some examples, the switch may assign the port and/or associated network link to the previously created LAG so that the switch may use the port along with other ports also assigned to the previously created LAG when forwarding network traffic to the neighboring switch associated with the received remote switch-id. After the port is assigned to the previously created LAG, the switch may begin maintenance and verification of the previously created LAG using the processes 470 and 480.

At the optional process 470, a hello message is transmitted using the port. In some examples, once the port is associated with a LAG, the switch may begin maintenance and verification of the LAG and the port and/or network link assigned to the LAG by periodically transmitting a hello message using the port. In some examples, the hello message may include a switch-id of the switch and a LAG-id of the LAG the port is assigned to so that the neighboring switch coupled to port may also maintain its corresponding port and LAG. In some examples, the hello message may be used to periodically confirm the configuration of the LAG. In some examples, the hello message may be a LACPDU. In some examples, the hello message may be one of the messages 162, 164, 166, 168, 172, 174, 176, 178, 310, 320, 330, and/or 340.

At the optional process 480, it is determined whether a response is received. In some examples, when the neighboring switch receives the hello message transmitted during the process 470, the neighboring switch may respond with a response message. In some examples, the response message may be a corresponding hello message of the neighboring switch. In some examples, when the response message includes remote switch and LAG information, the switch may use the response to confirm the configuration of the port used to transmit the hello message during the process 470 and the LAG to which the port is assigned. In some examples, the response message may be a LACPDU. In some examples, the response message may be one of the messages 162, 164, 166, 168, 172, 174, 176, 178, 310, 320, 330, and/or 340. When the response is received during the process 480, another hello message is transmitted using the process 470. When the response is not received during the process 480, the method 400 may return to the process 420 to rediscover the configuration of the switch associated with the port by transmitting probe messages. In some examples, the process 480 may wait until no response has been received for multiple consecutive hello messages before returning to the process 420. In some examples, a number of multiple consecutive hello messages before returning to the process 420 may be three.

Figure 5:
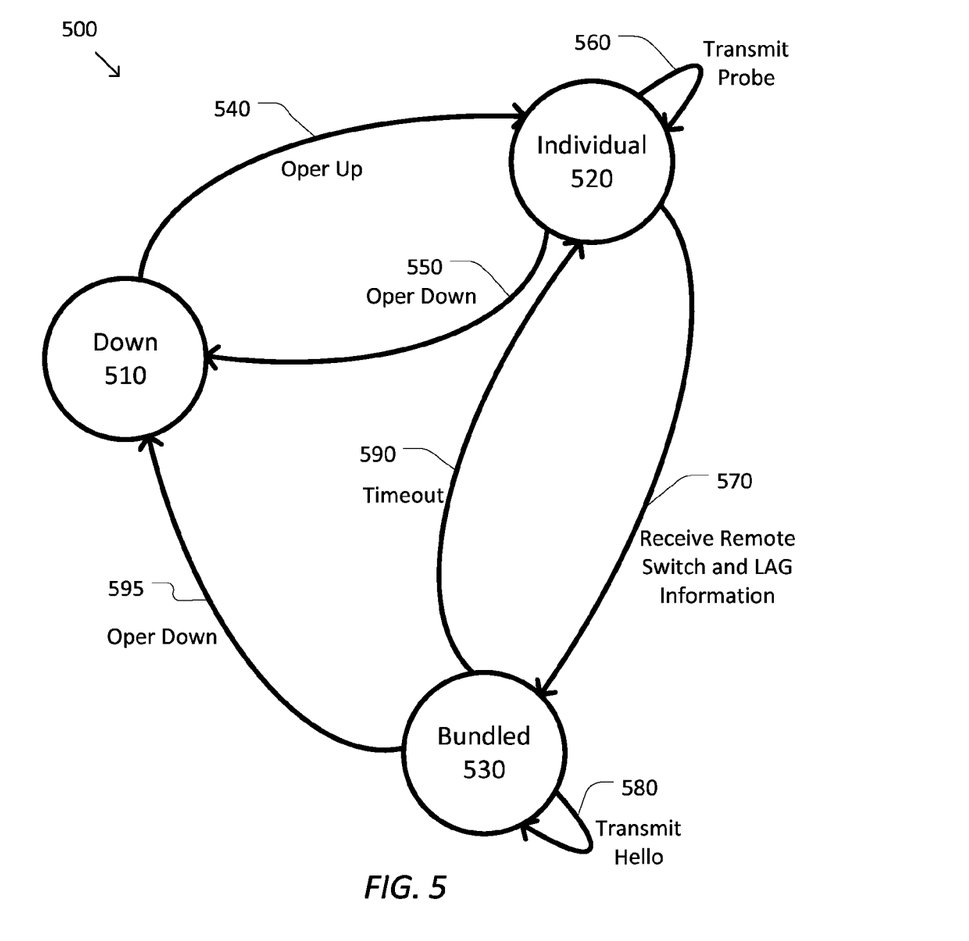
FIG. 5 shows a simplified diagram of a state machine for a port of a switch according to some embodiments.

FIG. 5 shows a simplified diagram of a state machine 500 for a port of a switch according to some embodiments. In some examples, the port may be one of the ports 116, 126, and/or 136. In some examples, the switch may be the switch 110, 120, and/or 130. As shown in FIG. 5, the state machine 500 for a port may include three states, a down state 510, an individual state 520, and a bundled state 530. Down state 510 indicates that the port is not operational. In some examples, the port may be in the down state 510 due to a hardware failure. In some examples, the port may be in the down state 510 when no functional network link is coupled to the port. In some examples, the port may be in the down state 510 when a neighboring switch coupled to the port using a functional network link is not responding. Individual state 520 indicates that the port is not assigned to any LAG. In some examples, the port may be in the individual state when only a single network link couples the switch to another neighboring switch or networking device. In some examples, the port may be in the individual state before the switch receives and/or determines configuration information for the port. Bundled state 530 indicates that the port is assigned to a LAG. In some examples, the port may be the only port assigned to the LAG. In some examples, other ports may also be associated with the LAG.

As shown in FIG. 5, the port may transition 540 from the down state 510 to the individual state 520 because of an operation up event. In some examples, the operation up event may be associated with a message received on the port from a neighboring switch. In some examples, the operation up event may be associated with a setting received from a control unit of the switch.

Once in the individual state 520, the port may transition 550 back to the down state 510 because of an operation down event. In some examples, the operation down event may be associated with a message received on the port from a neighboring switch. In some examples, the operation down event may be associated with a setting received from a control unit of the switch.

While in the individual state 520, the port may be used to transmit periodic probe messages. In some examples, the periodic probe messages may be used to prompt a neighboring switch to respond with remote switch and LAG information. In some examples, the periodic probe messages may be the probe messages 330 and/or 340. In some examples, the period probe messages may be transmitted using the process 420. In some examples, while transmitting the periodic probe messages, the port remains in the individual state 520 as shown by the transition 560.

The port may transition 570 from the individual state 520 to the bundled state 530 when remote switch and LAG information are received on the port. In some examples, the remote switch and LAG information may be received from the neighboring switch in response to the periodic probe messages. In some examples, the remote switch and LAG information may be received during the process 430. In some examples, the remote switch and LAG information may be the remote switch and LAG information detected during the process 410. Once the port transitions to the bundled state 530, the port becomes assigned to a LAG. When the remote switch and LAG information match remote switch and LAG information previously received by the switch, the port is associated with other ports already assigned to the LAG (e.g., using the process 460). When the remote switch and LAG information does not match remote switch and LAG information previously received by the switch, the LAG is created and the port is assigned to the LAG (e.g., using the process 450).

While in the bundled state 530, the port may be used to transmit periodic hello messages. In some examples, the periodic hello messages may be used to monitor and/or verify configuration of the port and the LAG to which it is assigned. In some examples, the periodic hello messages may be one of the messages 162, 164, 166, 168, 172, 174, 176, 178, 310, 320, 330, and/or 340. In some examples, the periodic hello messages may be transmitted using the process 470. In some examples, while transmitting the periodic hello messages, the port remains in the bundled state 530 as shown by the transition 580.

The port may transition 590 from the bundled state 530 back to the individual state 520 when a timeout occurs. In some examples, the timeout occurs when no response is received to the periodic hello messages. In some examples, the timeout occurs when no response is received to multiple consecutive periodic hello messages. In some examples, a number of consecutive periodic hello messages that are missed before the timeout may be three. In some examples, the timeout corresponds to no response being received during the process 480.

Once in the bundled state 530, the port may transition back to the down state 510 because of an operation down event 595. In some examples, the operation down event 595 may be associated with a message received on the port from a neighboring switch. In some examples, the operation down event 595 may be associated with a setting received from a control unit of the switch.

Some embodiments of the switches 110, 120, and/or 130 may include non-transient, tangible, machine readable media that include executable code that when run by one or more processors may cause the one or more processors (e.g., the one or more processors of the control units 112, 122, and/or 132) to perform the processes of method 200 and/or 400 and/or implement the state machine 500 as described above. Some common forms of machine readable media that may include the processes of methods 200 and/or 400 and/or the state machine 500 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A network switching device comprising:
    a control unit; and
    a port coupled to the control unit and configured to couple the network switching device to a neighboring device;
    wherein the control unit is configured to:
        receive first configuration information from the neighboring device on the port, wherein the first configuration information includes a remote switch identifier and a remote link aggregation group (LAG) identifier;
        determine whether the first configuration information matches second configuration information, the second configuration information having been previously received by the control unit; and
        when the first configuration information matches the second configuration information:
            determine a first LAG associated with the second configuration information; and
            assign the port to the first LAG.

2. The network switching device of claim 1, wherein when the first configuration information does not match the second configuration information:
    create a second LAG;
    assign the port to the second LAG; and
    associate the first configuration information with the second LAG.

3. The network switching device of claim 1 wherein the first configuration information is received in a link aggregation control protocol (LACP) data unit (LACPDU).

4. The network switching device of claim 2, wherein the control unit is further configured to:
    periodically transmit a hello message to the neighboring device using the port; and
    determine whether a response message is received from the neighboring device on the port.

5. The network switching device of claim 4 wherein the control unit is further configured to confirm a configuration of the port and the first LAG or the second LAG to which the port is assigned based on information associated with the response message.

6. The network switching device of claim 4 wherein the hello message includes third configuration information.

7. The network switching device of claim 6, wherein the third configuration information includes a switch identifier that identifies the network switching device and a LAG identifier that identifies the first LAG or the second LAG to which the port is assigned.

8. The network switching device of claim 1 wherein the port includes a down state, an individual state, and a bundled state.

9. The network switching device of claim 8 wherein the port transitions from the individual state to the bundled state after the first configuration information is received.

10. The network switching device of claim 8 wherein the control unit is further configured to transmit periodic hello messages using the port when the port is in the bundled state.

11. The network switching device of claim 10 wherein the port transitions from the bundled state to the individual state when one or more hello messages are transmitted using the port and no response message is received on the port.

12. A method of configuring a network switching device, the method comprising:
    receiving first configuration information including a remote switch identifier and a remote link aggregation group (LAG) identifier from a neighboring device on a port of the network switching device, the network switching device being coupled to the neighboring device via the port;
    determining whether the first configuration information matches second configuration information, the second configuration information having been previously received by the network switching device;
    when the first configuration information matches the second configuration information:
        determining a first LAG associated with the second configuration information; and
        assigning the port to the first LAG.

13. The method of claim 12, further comprising:
    when the first configuration information does not match the second configuration information:
        creating a second LAG;
        assigning the port to the second LAG; and
        associating the first configuration information with the second LAG.

14. The method of claim 13, further comprising:
    periodically transmitting a hello message to the neighboring device using the port; and
    determining whether a response message is received from the neighboring device on the port.

15. The method of claim 14, further comprising confirming a configuration of the port and the first LAG or the second LAG to which the port is assigned based on information associated with the response message.

16. The method of claim 14, wherein the hello message includes third configuration information.

17. The method of claim 16, wherein the third configuration information includes a switch identifier that identifies the network switching device and a LAG identifier that identifies the first LAG or the second LAG to which the port is assigned.

18. An information handling system comprising:
    a network switching device comprising:
        a control unit comprising one or more processors;
        a memory coupled to the control unit; and
        a port coupled to the control unit and configured to couple the network switching device to a neighboring device;

wherein the memory includes a plurality of machine-readable instructions which when executed by the one or more processors are adapted to cause the one or more processors to:
  receive first configuration information from the neighboring device on the port;
  determine whether the first configuration information matches second configuration information, the second configuration information having been previously received by the control unit; and
  when the first configuration information matches the second configuration information:
    determine a first link aggregation group (LAG) associated with the second configuration information; and
    assign the port to the first LAG;
  when the first configuration information does not match the second configuration information:
    create a second LAG;
    assign the port to the second LAG; and
    associate the first configuration information with the second LAG;
  wherein the port includes a down state, an individual state, and a bundled state.

* * * * *